Dec. 1, 1942.  W. JAMES  2,303,840
GRAPHIC RECORDING INSTRUMENT
Original Filed Aug. 24, 1937  2 Sheets-Sheet 2
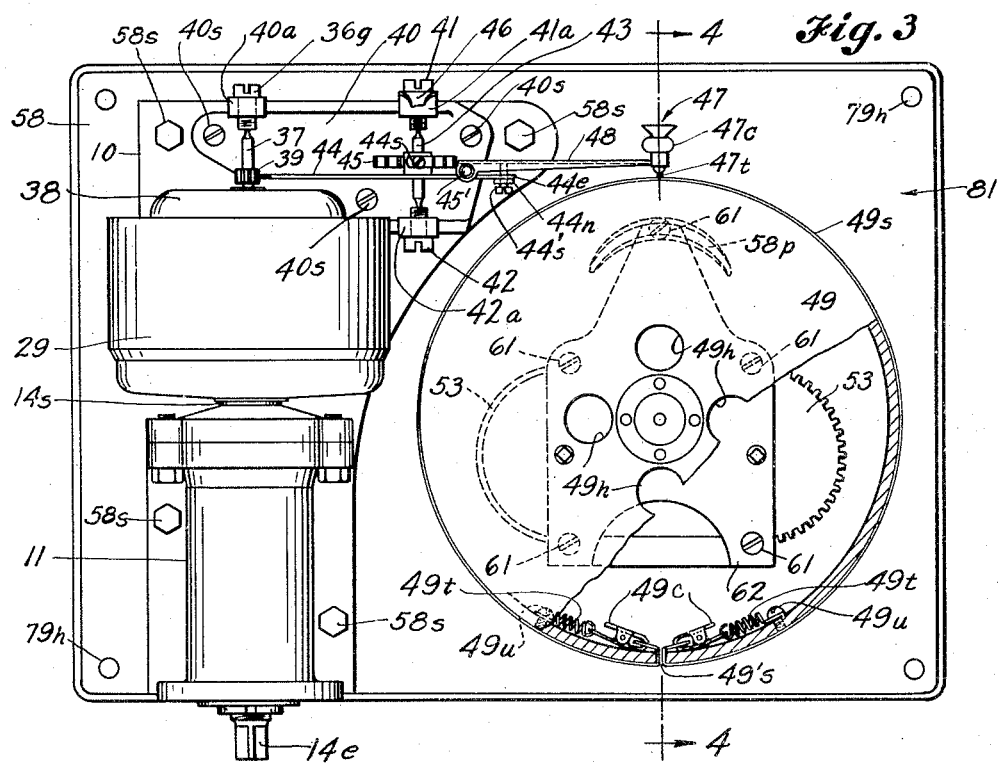
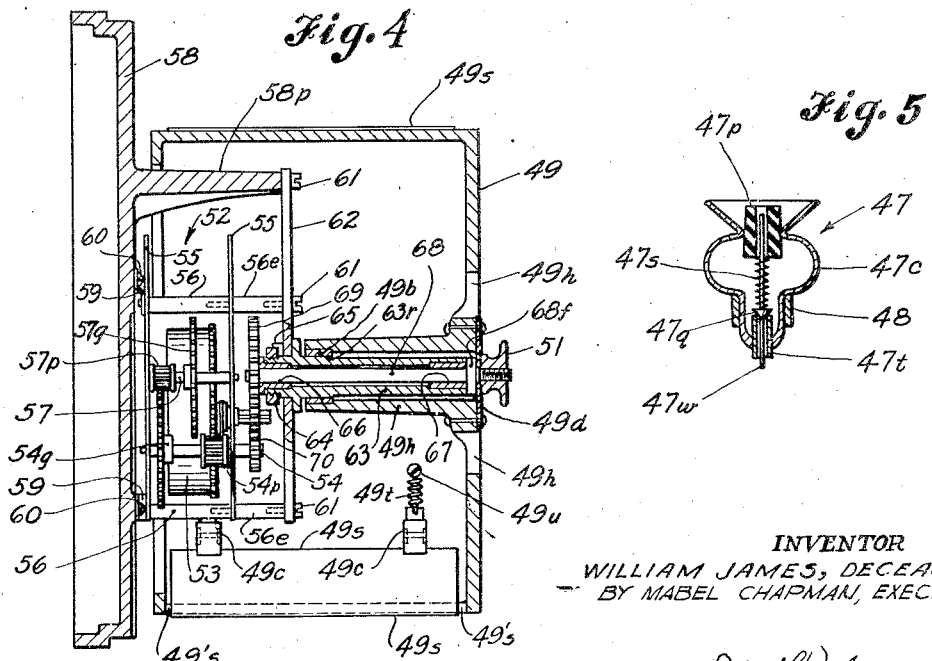
INVENTOR
WILLIAM JAMES, DECEASED
BY MABEL CHAPMAN, EXECUTRIX
BY Robert L. Rockwell
ATTORNEY Patented Dec. 1, 1942

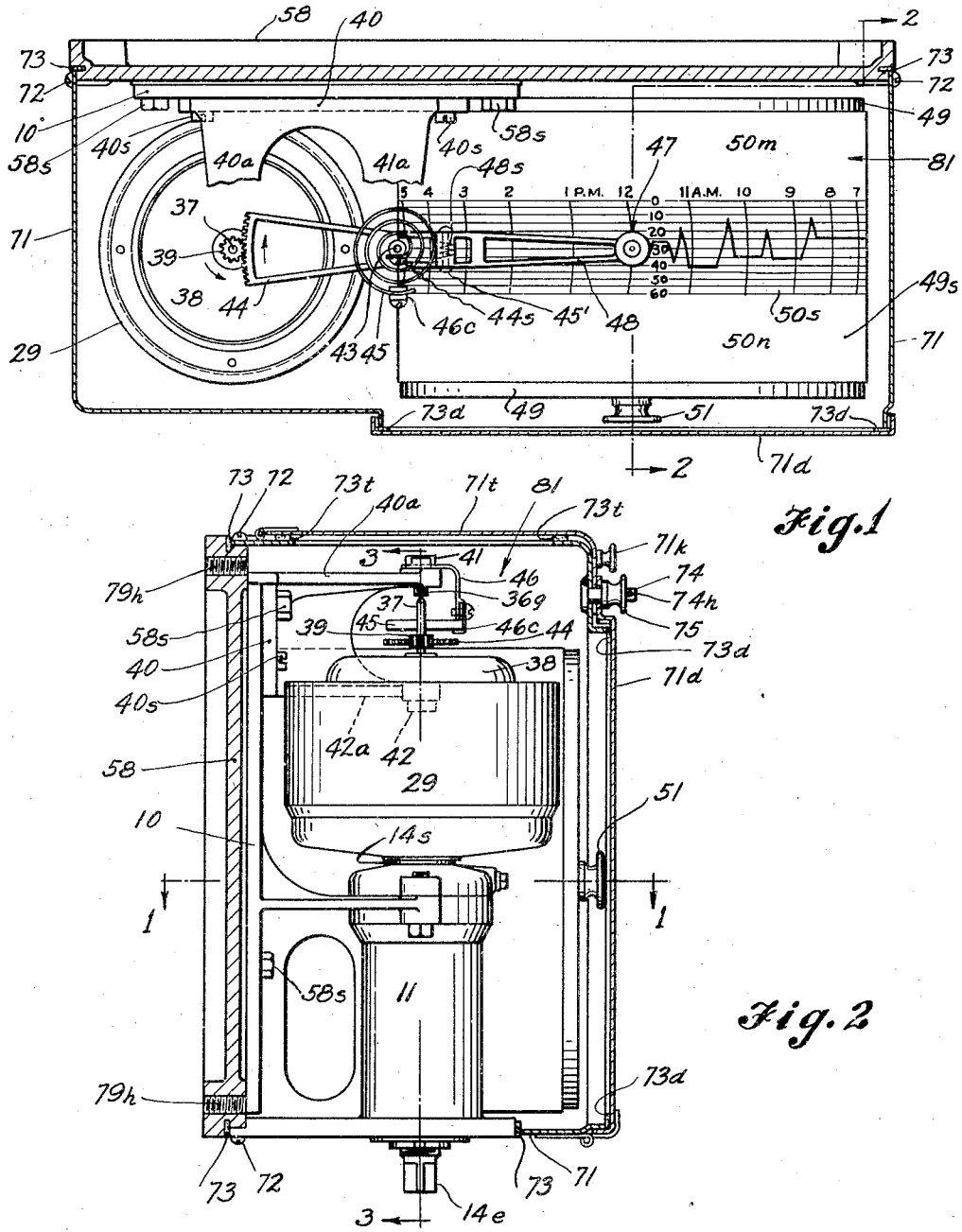

2,303,840

UNITED STATES PATENT OFFICE 2,303,840

GRAPHIC RECORDING INSTRUMENT

William James, deceased, late of Seattle, Wash., by Mabel Chapman, executrix, Boise, Idaho, assignor to Florence L. Cromwell, Monroe, Wash.

Original application August 24, 1937, Serial No. 160,638. Divided and this application May 20, 1941, Serial No. 394,388

5 Claims. (Cl. 234—77)

This invention relates to graphic recording instruments in general, and particularly to revolving-drum types of such instruments that are adapted to be mounted upon, and to record the speed of, automotive vehicles.

The invention is characterized by the improved combination of coacting parts that are adapted to both support and rotate the chart drum, and to facilitate the daily operation of changing charts.

The improvement comprising the invention is especially adapted to work cooperatively with the inventor's speed responsive unit for actuating the recording pen, as explained in my copending application, Serial No. 160,638, filed Aug. 24, 1937, now Patent No. 2,245,784, issued June 17, 1941, of which this is a division.

An object of the invention is to provide improved means in a graphic recorder of the kind described for facilitating the installation and removal of the chart drum.

A further object is to provide improved means for motivating said chart drum by a clock mechanism.

A still further object is to provide a compact clock mechanism and chart drum spindle assembly that may be installed and serviced as a compact unit.

Other objects and advantages will be apparent to those skilled in the art from the following detailed description of a preferred form of the invention, which consists of certain parts and combination of parts, hereinafter described, illustrated in the accompanying drawings and embraced in the appended claims.

In the drawings:

Figure 1 is a top view of a speed recorder instrument embracing a preferred form of the invention with the base and housing in section, taken on broken line 1—1 of Fig. 2, and with the top bearing brackets broken away;

Fig. 2 is a left side elevation of the instrument, with the base and housing in section, taken on broken line 2—2 of Fig. 1;

Fig. 3 is a front elevation of the mechanism, with a portion of the radial element of the chart drum broken away to show a portion of the spindle support plate and clock mechanism, and with the inclosing housing removed;

Fig. 4 is a section through the chart drum and base, taken on broken line 4—4 of Fig. 3, showing a side elevation of the mechanism for rotatively supporting and motivating the drum; and Fig. 5 is a medial sectional elevation of the inking device to a larger scale.

Like reference numerals are used to indicate like parts throughout the drawings, wherein 10 refers to the frame for the speed responsive element, comprising a spindle bearing housing 11, rotating spindle 14s, magnet system cup 29, induction element 38, pinion 39 and induction element shaft 37, as described in detail in my aforesaid copending application.

A pivot frame 40, comprising arms 40a, 41a and 42a, may be removably secured to frame 10 by means of screws 40s, and frame 10 in turn secured to frame 10 by means of screws 40s, and frame 10 in turn secured to base 53 by means of cap screws 58s.

Screw 36g carries a jewel guide bearing for the upper end of shaft 37 and is removably supported by arm 40a. Arms 41a and 42a carry bearing screws 41 and 42 in which a second pivot shaft 43 is rotatively supported. A gear sector element 44 is fixedly secured to shaft 43 by means of screw 44s, which serves also to secure one end of spiral control spring 45 to the hub of the sector, as shown best in Fig. 1. The other end of said spring is fixedly secured by a clamp 46c at the end of adjustment arm 46, which may be clamped in fixed position by means of the head of screw 41. This spring forces the gear sector into its position for recording on the 0-line of the chart when the magnet system is not rotating.

A line-drawing inking device or pen 47, is carried at the end of a light aluminum arm 48, hinge connected to gear sector element 44 by means of pin 45'. Spring 48s is used to resiliently hold said arm 48 against an adjustable stop screw 44's, which is locked in position in an extension 44e of element 44 by means of lock nut 44n. The adjustment is such that the end of small pen tube 47t of the inking device (Fig. 5) just clears the surface of a suitably calibrated chart 49s stretched tightly around a clock-mechanism-driven chart drum 49.

Contact with the chart is maintained by means of a freely fitting wire 47w on which a stopper 47q for the end of said pen tube is fixedly secured. Above said stopper is a spring 47s which supports a rubber stopper 47p that fits freely over the upper end of said wire but is adapted to close the neck of the ink container 47c due to the upward thrust of spring 47s. In this way a thin film of ink is fed onto the moving chart, the only resistance to the lateral movement of the pen arm being the very light wire 47w and its appended parts.

It will be seen in said Figs. 3 and 4 that chart drum 49 is both supported and motivated by an interior clock mechanism unit, a preferred form of which comprises a clock mechanism 52, spindle support plate 62 and a plurality of associated coacting parts hereinafter explained. Said clock mechanism may be removably secured to base 58 of the instrument by means of heavy lugs 59 and screws 60, and may be of the standard double-main-spring type, several of the well known detail parts of which are omitted in Fig. 4 for the sake of clearness.

The driving power for the clock mechanism is derived from two main-spring elements 53 on either side of the frame, as shown in Fig. 3. Both spring elements are provided with peripheral gear teeth that mesh with the teeth of pinion 54p fixedly secured to shaft 54. Said shaft and the other rotating parts of the mechanism are rotatively mounted in bearing plates 55, fixedly secured to the ends of spacer posts 56 in the usual manner. Shaft 54 ordinarily carries the hour hand of the clock and makes one revolution in 12 hours. Its rate of rotation is determined by the operation of the well known escapement and other elements, not shown, through the intermediacy of gear 54g, pinion 57p, shaft 57 and gear 57g in the usual manner.

Screws 61 secure a spindle support plate 62 to post 58p, projecting from base 58, and to threaded extension posts 56e of the clock frame. A hollow spindle 63 is fixedly secured at its flanged and threaded end to plate 62 by means of nut 64 and lock washer 65. Bearings 66 and 67 at the ends of said spindle are adapted to rotatively support shaft 68 positioned longitudinally in the spindle by means of flange 68f at its outer end, and gear 69 fixedly secured to its inner end. Gear 69 meshes with a pinion 70 fixedly secured to the projecting end of shaft 54, and has twice the number of teeth in said pinion, hence shaft 68 revolves at half the speed of shaft 54, or once in 24 hours.

Drum 49, preferably made of an aluminum alloy, is provided with an inwardly projecting hub 49h, which is fitted at its inner end with bearing sleeve 49b, adapted to rotate upon a larger portion 63r of spindle 63. A brass disc 49d may be fitted into a recess and riveted to the drum to provide a driving connection with shaft 68 when clamped between flange 68f and nut 51. When assembled as shown, it will be seen that the drum is supported on spindle 63 through bearing 49b and by the outer end of shaft 68, which in turn is rotatively supported by said hollow spindle through bearings 66 and 67. After nut 51 is removed, the thumb and first three fingers of one's hand may be inserted in holes 49h to secure a good grasp of the drum when removing or replacing it by sliding it axially of spindle 63.

Any suitable means may be used to secure the chart to the drum, such as a slot 49's in the rim through which the ends of the chart may be passed after encircling the periphery of the drum, and then drawn tight by clips 49c secured to the drum through the intermediacy of springs 49t, fixedly secured inside the drum by means of screws 49u, as illustrated in Fig. 3.

The interior parts of the device are inclosed by a housing 71 fixedly secured to base 58 by means of screws 72, a felt gasket strip 73 being used to make a dust tight joint. The heads of screws 72 may be soldered to the housing to prevent unauthorized tampering. The housing is provided with circular door 71d hinged at the bottom to provide access to the chart drum, and with a top door 71t provided with a knob 71k to afford access to the inking device.

Both doors are provided with lugs which fit over the projecting end of screw 74, the head of which may be brazed to the inside of the housing. When the doors are closed a single thumb nut 75 forces both doors tightly closed against felt gaskets 73d and 72t. Hole 74h in screw 74 is provided for the wire portion of the usual lead seal (not shown), used to prevent access by other than authorized persons. Holes 79h are provided for mounting screws.

Referring particularly to Figs. 1 and 3, it will be seen that a space 81 is provided in the upper right corner within housing 71, and that ample margins 50m and 50n are left on either side of speed scale 50s of chart 49s. Said space and margins are provided so other recording mechanisms (not shown) may be added within the housing to record other important events in the operation of the vehicle associated with its speed, such as brakes "on" or "off," ignition "on" or "off," lights "on" or "off," and turns to "right" or "left," thus providing a graphic record of the vehicle's operations during its tour of duty, that would be invaluable in fixing the blame for accidents and in indicating carelessness on the part of the driver.

From the foregoing description it will be apparent, that after the vehicle has been returned to the garage, the chart is made available by the following simple operations by an authorized person:

1. Break seal in hole of screw 74.
2. Remove thumb nut 75.
3. Open doors 71d and 71t, and remove thumb nut 51.
4. Raise hinged pen arm 48 with one hand, grasp drum by means of holes 49h with the other hand and remove from spindle 63.
5. Release clips 49c from the ends of the chart and remove same from the drum.

It will be noted that stopper 47q and spring 47s of the inking device prevent the ink from escaping when the pen arm is raised.

A new chart sheet then may be secured to the periphery of the drum, and the drum replaced on spindle 63 while the pen arm again is raised with the other hand. The drum next is turned until the pen tube is over the proper hour position on the chart, and then thumb nut 51 is replaced and set up tight.

The supply of ink next may be replenished by means of a medicine dropper filled with ink. This is done by using the end of the dropper to depress stopper 47p and compress spring 47s until the required amount of ink is discharged from the dropper into ink container 47c. Doors 71t and 71d then may be closed, thumb nut 75 replaced, and a new seal placed in the hole of screw 74.

When arm 48 is lowered to the position shown in Fig. 3, it will be noted by referring to Fig. 5 that wire 47w again is pushed upwardly, thereby slightly compressing spring 47s and forcing stopper 47p into the neck of ink container 47. The free fit of wire 47w in the hole of said stopper permits sufficient air to enter ink container 47c so ink will feed downwardly onto the chart.

From the foregoing it will be clear that clock mechanism 52, spindle support plate 62 and the hereinbefore described associated parts coact to produce a simple compact clock mechanism and chart drum spindle assembly that may be installed and serviced as a compact unit, and that the daily installation and removal of the chart drum is facilitated.

Although the preferred embodiment of the invention herein illustrated and described is devised for use in connection with automotive vehicles, it will be apparent to those skilled in the art that the combination of coacting elements constituting the invention may be adapted and applied to various other recording devices, and that various changes may be made in the details of construction and arrangement of parts without departing from the purpose and intent of the invention within the scope of the appended claims.

What is claimed as new and desired to be protected by Letters Patent is:

1. In a graphic recorder, the combination of a base providing post means projecting therefrom, a clock mechanism fixedly secured to said base, a plate in spaced apart relation to said clock and fixedly secured to said post means, a hollow spindle fixedly secured to said plate, a shaft rotatively mounted in said spindle, a removable chart drum comprising an inwardly projecting hub portion rotatively supported by said spindle, clamp means for removably securing the outer end of said shaft to said drum, and gear means fixedly secured to the other end of said shaft for motivating the same by said clock mechanism.

2. In a graphic recorder, the combination of a base providing post means projecting therefrom, a clock mechanism fixedly secured to said base, a plate in spaced apart relation to said clock mechanism and fixedly secured to said post means, extension post means for fixedly securing said plate to said clock mechanism, a hollow spindle fixedly secured to said plate, a shaft rotatively mounted in said spindle, a chart drum comprising a hub portion rotatively supported by said spindle at one end, means for fixedly securing the other end of said hub portion to the outer portion of said shaft, and gear means fixedly secured to the inner portion of said shaft for motivating the same by said clock mechanism.

3. In a graphic recorder, the combination of a base providing post means projecting therefrom, a clock mechanism, a plate in spaced apart relation to said clock mechanism and fixedly secured to said post means, means for fixedly connecting said clock mechanism and said plate, a hollow spindle fixedly secured at one end to and extending outwardly from said plate, a shaft rotatively mounted in said spindle, a chart drum comprising a hub portion rotatively supported by said spindle at one end, means for removably securing one end of said shaft to the other end of said hub portion, and gear means for connecting the other end of said shaft to said clock mechanism.

4. In a graphic recorder, the combination of a base providing post means projecting therefrom, a clock mechanism fixedly secured to said base, a plate in spaced apart relation to said clock mechanism and fixedly secured to said post means, a hollow spindle fixedly secured at one end to and extending outwardly from said plate, a shaft rotatively mounted in said spindle and comprising a shoulder and threaded outer end portion, gear means connecting said shaft with said clock mechanism, a removable chart drum comprising an inwardly projecting hub portion having bearing means rotatively engaging the exterior of said spindle near one end, and nut means for removably clamping the other end of said hub to the outer end of said shaft.

5. In a graphic recorder, a clock mechanism, a plate in spaced apart relation to said clock mechanism, extension post means for fixedly securing said plate to said clock mechanism, a hollow spindle fixedly secured at one end to said plate, a shaft rotatively supported in said spindle, a chart drum comprising a hub portion rotatively supported by said spindle at one end, clamp means for removably securing the other end of said hub portion to said shaft; and gear means for motivating said shaft by said clock mechanism.

MABEL CHAPMAN,
*Formerly Mabel James, Executrix of the estate of William James, Deceased, Superior Court King County, State of Washington, Cause #67,486 in said Court.*